United States Patent
Kim et al.

(10) Patent No.: US 9,239,656 B2
(45) Date of Patent: Jan. 19, 2016

(54) TOUCH DISPLAY DEVICE AND METHOD OF MANUFACTURING THE SAME

(71) Applicant: LG Display Co., Ltd., Seoul (KR)

(72) Inventors: Soo-Hwan Kim, Gyeongsangbuk-do (KR); Keuk-Sang Kwon, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 50 days.

(21) Appl. No.: 14/036,184

(22) Filed: Sep. 25, 2013

(65) Prior Publication Data
US 2014/0176826 A1 Jun. 26, 2014

(30) Foreign Application Priority Data

Dec. 24, 2012 (KR) .......................... 10-2012-0152247

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04103* (2013.01)

(58) Field of Classification Search
CPC .... G06F 3/041; G06F 3/04103; G06F 3/0416
USPC ................................. 349/12; 345/173; 445/24
See application file for complete search history.

(56) References Cited

U.S. PATENT DOCUMENTS

| | | | | |
|---|---|---|---|---|
| 8,581,862 B2* | 11/2013 | Oohira | ........................ | 345/173 |
| 2002/0005928 A1* | 1/2002 | Hanakawa et al. | ........... | 349/149 |
| 2007/0013678 A1* | 1/2007 | Nakajima | ............... | G06F 3/045 |
| | | | | 345/174 |
| 2007/0263129 A1* | 11/2007 | Park et al. | ........................ | 349/12 |
| 2008/0165158 A1* | 7/2008 | Hotelling et al. | ............. | 345/174 |
| 2009/0046077 A1* | 2/2009 | Tanaka et al. | ................. | 345/174 |

(Continued)

FOREIGN PATENT DOCUMENTS

| | | |
|---|---|---|
| CN | 102135845 A | 7/2011 |
| CN | 102707851 A | 10/2012 |
| TW | 201205384 A | 2/2012 |

(Continued)

OTHER PUBLICATIONS

Office Action dated Jan. 22, 2015, issued by the Taiwan Intellectual Property Office in Taiwanese Patent Application No. 102141747.

(Continued)

*Primary Examiner* — Sang V Nguyen
(74) *Attorney, Agent, or Firm* — Morgan, Lewis & Bockius LLP

(57) ABSTRACT

A touch display device and method of manufacturing a touch display device are provided. The touch display device includes: a display panel, an adhesive material layer on the display panel, a touch panel on the adhesive material layer, the touch panel including: a base film, a first touch electrode on a bottom surface of the base film, a second touch electrode on a top surface of the base film, and an insulating pattern at an edge portion of the bottom surface of the base film, and a cover glass on the touch panel.

18 Claims, 4 Drawing Sheets

(56) References Cited

U.S. PATENT DOCUMENTS

| | | |
|---|---|---|
| 2011/0181545 A1* | 7/2011 | Takahashi ............... G06F 3/041 345/174 |
| 2011/0298739 A1* | 12/2011 | Wu et al. ....................... 345/173 |
| 2011/0298750 A1* | 12/2011 | Wang .................... G06F 3/0412 345/174 |
| 2012/0032917 A1* | 2/2012 | Yamaguchi ........... G06F 3/0416 345/174 |
| 2012/0228106 A1 | 9/2012 | Horino |
| 2013/0000954 A1 | 1/2013 | Hashimoto et al. |
| 2013/0050115 A1* | 2/2013 | Oohira .......................... 345/173 |

FOREIGN PATENT DOCUMENTS

| | | |
|---|---|---|
| TW | 201209691 A | 3/2012 |
| WO | 2011/162221 A1 | 12/2011 |

OTHER PUBLICATIONS

Extended European Search Report and European Search Opinion dated May 9, 2014, issued by the European Patent Office in Application No. 13186623.8.

* cited by examiner

TOUCH DISPLAY DEVICE AND METHOD OF MANUFACTURING THE SAME

CROSS-REFERENCE TO RELATED APPLICATION(S)

This application claims the benefit under 35 U.S.C. §119 (a) of Korean Patent Application No. 10-2012-0152247, filed on Dec. 24, 2012, in the Korean Intellectual Property Office, the entire disclosure of which is incorporated by reference herein for all purposes.

BACKGROUND

1. Technical Field

The following description relates to a touch display device and method of manufacturing the same, and more particularly, to a touch display device and method of manufacturing the same, in which corrosion of touch lines of a touch panel is prevented.

2. Discussion of the Related Art

Recently, as the information age progresses, display devices processing and displaying a large amount of information have been rapidly developed. Specifically, various flat panel displays (FPDs) such as a liquid crystal display (LCD) device and an organic light emitting diode (OLED) display devices having a superior performance with a thin profile, a light weight, and a low power consumption have substituted for a cathode ray tube (CRT).

A touch display device in which a command of a user is inputted by selecting a portion of an image has been widely used. The touch display device includes a display panel displaying the image and a touch panel in front of the display panel. In response to a person's finger or an object's contacting a portion of the touch panel, a contact position of the portion is converted into an electric signal. As a result, a content of the image corresponding to the contact position is provided as an input signal.

FIG. 1 is a cross-sectional view showing a touch display device according to the related art.

In FIG. 1, a touch display device includes a display panel 10, a touch panel 20 on the display panel 10, a cover glass 30 on the touch panel 20, an adhesive material layer 40 for attaching the display panel 10 and the touch panel 20, and an adhesive film 50 for attaching the touch panel 20 and the cover glass 30.

For example, the display panel 10 may include a liquid crystal display (LCD) device or an organic light emitting diode (OLED) display device. The LCD device used as the display panel 10 may include a first substrate 12 having a thin film transistor (TFT) and a pixel electrode thereon, a second substrate 14 having a color filter layer and a common electrode thereon and a liquid crystal layer between the first and second substrates.

The touch panel 20 includes a third substrate 21 having a first touch electrode 25 thereon, a fourth substrate 23 having a second touch electrode 27 thereon, and a dielectric layer 29 between the third and fourth substrates 21 and 23.

The first and second touch electrodes 25 and 27 overlap each other with the dielectric layer 29 interposed therebetween to constitute a capacitor having a mutual capacitance. When an input means, such as a finger or a pen, contacts a portion of the touch panel 20, the mutual capacitance between the first and second touch electrodes 25 and 27 changes. Thereby, a position coordinate of the contact portion is obtained.

However, since the touch display device having the touch panel 20 includes the third substrate 21 having the first touch electrode 25 and the fourth substrate 23 having the second touch electrode 27, a thickness and a fabrication cost of the touch display device increase. In addition, as the number of the substrates increases, transmittance of the touch display device is reduced.

SUMMARY

Accordingly, embodiments of the present application are directed to a touch display device and method of manufacturing the same that substantially obviates one or more of problems due to the limitations and disadvantages of the related art.

An object of embodiments is to provide a touch display device where increase in thickness and fabrication cost and reduction in transmittance are prevented by changing the structure thereof.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a touch display device, includes: a display panel, an adhesive material layer on the display panel, a touch panel on the adhesive material layer, the touch panel including: a base film, a first touch electrode on a bottom surface of the base film, a second touch electrode on a top surface of the base film, and an insulating pattern at an edge portion of the bottom surface of the base film, and a cover glass on the touch panel.

In another aspect, there is provided a method of forming a touch display device, the method including: forming a display panel; forming an adhesive material layer on the display panel; forming a touch panel on the adhesive material layer, the forming a touch panel comprising: forming a base film; forming a first touch electrode on a bottom surface of the base film; forming a second touch electrode on a top surface of the base film; and forming an insulating pattern at an edge portion of the bottom surface of the base film; and forming a cover glass on the touch panel.

It is to be understood that both the foregoing general description and the following detailed description are examples and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
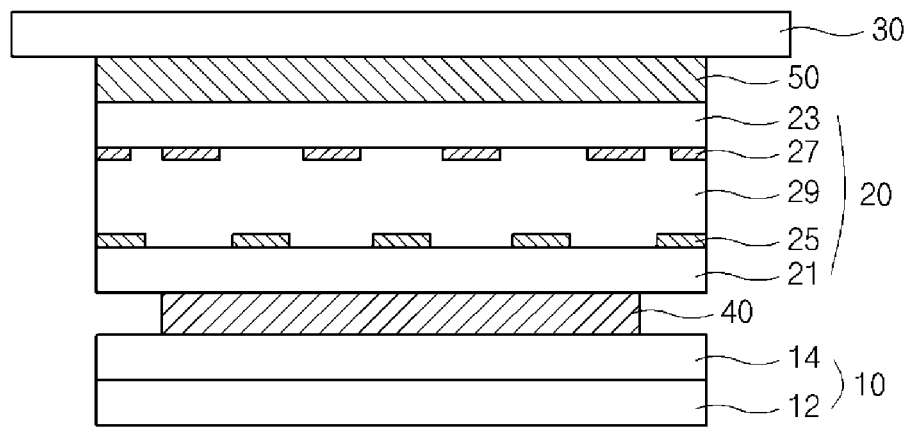
FIG. 1 is a cross-sectional view showing a touch display device according to the related art.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Figure 2:
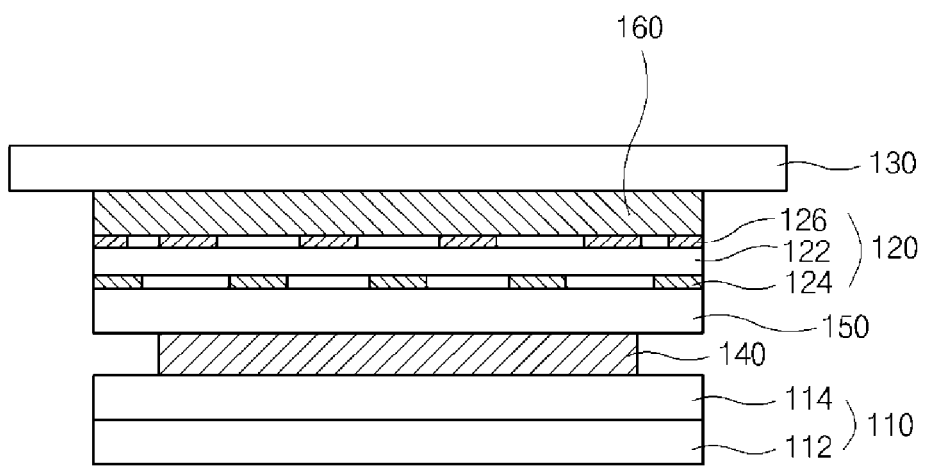
FIG. 2 is a cross-sectional view showing a touch display device according to an embodiment.

FIG. 2 is a cross-sectional view showing a touch display device according to an embodiment.

In FIG. 2, a touch display device according to an embodiment may include a display panel 110, a touch panel 120 on the display panel 110, a cover glass 130 on the touch panel 120, an adhesive material layer 140 for attaching the display panel 110 and the touch panel 120, a polyethylene terephthalate (PET) film 150 covering an entire bottom surface of the touch panel 120, and an adhesive film 160 for attaching the touch panel 120 and the cover glass 130.

For example, the display panel 110 may include a liquid crystal display (LCD) device or an organic light emitting diode (OLED) display device. The LCD device used as the display panel 110 may include a first substrate 112 having a thin film transistor (TFT) and a pixel electrode thereon, a second substrate 114 having a color filter layer and a common electrode thereon, and a liquid crystal layer between the first and second substrates.

The touch panel 120 may include a base film 122 and first and second touch electrodes 124 and 126 on opposite surfaces of the base film 122. For example, the first touch electrode 124 may be formed on a bottom surface of the base film 122, and the second touch electrode 126 may be formed on a top surface of the base film 122. The base film 122 may function as a dielectric layer between the first and second touch electrodes 124 and 126, such that the base film 122 and the first and second touch electrodes 124 and 126 may constitute the touch panel 120. Each of the first and second touch electrodes 124 and 126 may include a transparent conductive material, such as indium-tin oxide (ITO) and indium-zinc-oxide (IZO).

In a touch panel according to the related art in FIG. 1, as the first and second touch electrodes 25, 27 are formed on upper and lower substrates 21, 23, respectively, facing and spaced apart from each other, thickness and fabrication cost of the related art touch display device increase as compared with a display device according to an embodiment.

In the touch panel 120 according to an embodiment, as the first and second touch electrodes 124 and 126 may be formed on the bottom and top surfaces, respectively, of the single base film 122, increase in thickness and fabrication cost of the touch display device may be minimized. The touch panel 120 may be attached to the display panel 110 with the adhesive material layer 140, and the cover glass 130 may be attached to the touch panel 120 with the adhesive film 160 covering entire top surface of the touch panel 120. For example, each of the adhesive material layer 140 and the adhesive film 160 may include one of an optically clear resin (OCR) and an optically clear adhesive (OCA).

The adhesive material layer 140 may be formed by coating and curing an adhesive material. For example, after a sidewall is formed in an edge portion of a top surface of the display panel 110, an adhesive material of a liquid phase may be formed in the sidewall on the display panel 110 and then may be cured to form the adhesive material layer 140 on the display panel 110. As a result, a boundary portion of the display panel 110 and the touch panel 120 may be exposed outside the adhesive material layer 140. As the first touch electrode 124 in a non-display region on the bottom surface of the base film 122 may be exposed outside the adhesive material layer 140, the first touch electrode 124 in the non-display region may be deteriorated physically or chemically.

Although not shown, a first connection line of a metallic material such as copper (Cu) and aluminum (Al) may be formed in the non-display region of the base film 122 for connecting the first touch electrode 124 of a transparent conductive material, such as ITO and IZO, to an external circuit. As the first connection line in the non-display region on the bottom surface of the base film 122 may be exposed outside the adhesive material layer 140, the metallic material of the first connection line in the non-display region may be corroded. For the purpose of preventing deterioration of the first touch electrode 124 and corrosion of the first connection line, for example, the PET film 150 may be formed on the bottom surface of the base film 122 of the touch panel 120, and the adhesive material layer 140 may be attached to the PET film 150.

Figure 3:
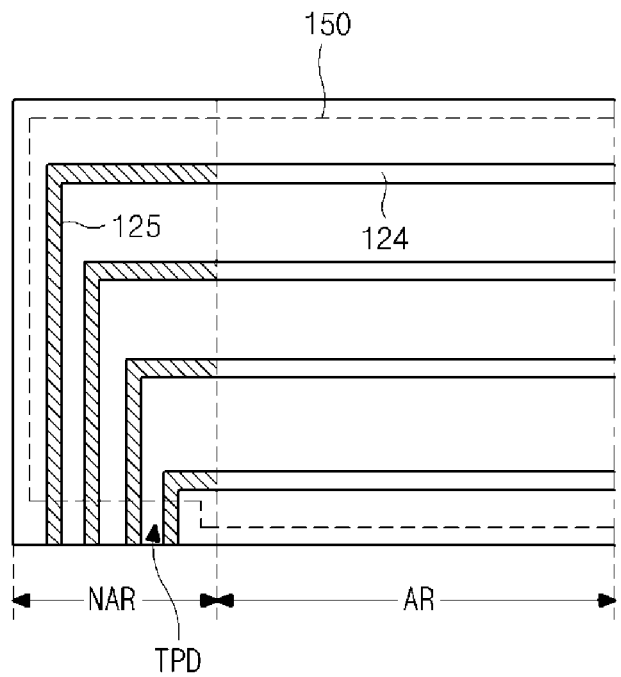
FIG. 3 is a plan view showing a bottom surface of a touch panel of a touch display device according to an embodiment.
Figure 4:
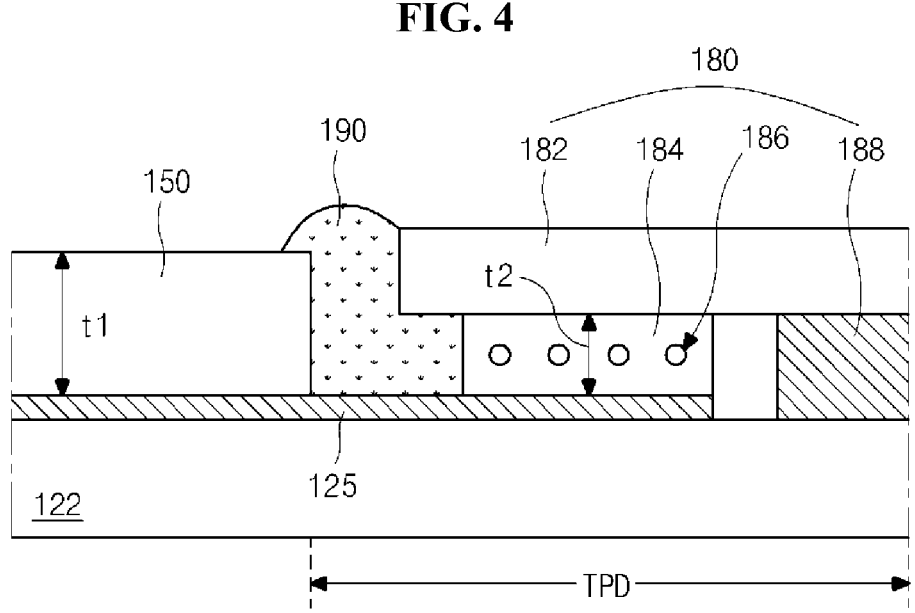
FIG. 4 is a cross-sectional view showing a bonding structure of a touch panel of a touch display device according to an embodiment.

FIG. 3 is a plan view showing a bottom surface of a touch panel of a touch display device according to an embodiment. FIG. 4 is a cross-sectional view showing a bonding structure of a touch panel of a touch display device according to an embodiment.

In FIG. 3, the first touch electrode 124 may be formed along a first direction in the display region AR (e.g., active region) on the bottom surface of the base film 122 (FIG. 2) of the touch panel 120 (FIG. 2), and the second touch electrode 126 (FIG. 2) may be formed along a second direction crossing the first direction in the display region AR on the top surface of the base film 122. As the light from the display panel 110 (FIG. 2) for displaying an image may pass through the display region AR, the first and second touch electrodes 124, 126 may include a transparent conductive material, such as ITO and IZO, for example, for increasing transmittance.

In addition, the first connection line 125 connected to the first touch electrode 124 may be formed in the non-display region NAR (e.g., non-active region) on the bottom surface of the base film 122, and the second connection line (not shown) connected to the second touch electrode 126 (FIG. 3) may be formed in the non-display region NAR on the top surface of the base film 122. The first connection line 125 may connect the first touch electrode 124 to the external circuit (not shown) and the second connection line may connect the second touch electrode 126 to the external circuit. As the first connection line 125 and the second connection line may transmit signals for touch sensing between the external circuit and the touch panel 120, the first connection line 125 and the second connection line may include a metallic material, such as Cu and Al, for reducing resistance and delay.

For example, the first and second touch electrodes 124 and 126 may have a single-layered structure of a transparent conductive material layer, and the first connection line 125 and the second connection line may have a double-layered structure of a transparent conductive material layer and a metallic material layer on the transparent conductive material layer. The transparent conductive material layer under the metallic material layer of the first connection line 125 and the second connection line may have the same material and the same layer as the transparent conductive material layer of the first and second touch electrodes 124, 126.

Since the adhesive material layer 140 for attaching the display panel 110 and the touch panel 120 may have an area smaller than the touch panel 120, the PET film 150 may be formed on the bottom surface of the touch panel 120 for protecting the first connection line 125 exposed outside the adhesive material layer 140 in the non-display region NAR. As a result, the PET film 150 may cover the first connection line 125.

For the purpose of attaching a flexible printed circuit (FPC) for connection with the external circuit, for example, a portion of the first connection line 125 may not be covered with the PET film 150, such that the first connection line 125 may be partially exposed outside the PET film 150 in a touch pad portion TPD. Although not shown, the second connection line may also be partially exposed for connection with the external circuit.

In FIG. 4, the first connection line 125 of the touch pad portion TPD may be exposed outside the PET film 150, and an FPC 180 may be connected to the first connection line 125 of the touch pad portion TPD.

The FPC 180 may include a base 182, an anisotropic conductive film (ACF) 184 in an end portion on the base 182 and an insulating layer 188 in a central portion on the base 182. The ACF 184 may include a conductive ball 186, for example, for electrical connection. Although not shown, a plurality of signal lines may be formed on the base 182, and the insulating layer 188 may protect the plurality of signal lines.

After the FPC 180 may contact the ACF 184 on the first connection line 125, the FPC 180 may be pressurized toward the first connection line 125, such that the plurality of signal lines on the base 182 may be electrically connected to the first connection line 125 through the conductive ball 186. As the FPC 180 may not cover the whole of the first connection line 125 of the touch pad portion TPD, the first connection line 125 of the touch pad portion TPD may be partially exposed outside the FPC 180. As a result, a resin pattern 190 may be formed on the first connection line 125 for preventing corrosion of the exposed first connection line 125.

Since the ACF 184 may have a thickness smaller than the PET film 150, the FPC 180 may be disposed, such that the FPC 180 may be spaced apart from and may not overlap the PET film 150, for example, for electrical connection. For example, the PET film 150 may have a first thickness t1 within a range of about 30 μm to about 40 μm, and the ACF 184 may have a second thickness t2 within a range of about 5 μm to about 20 μm, in which the second thickness t2 is smaller than the first thickness t1. When the FPC 180 is formed to cover the whole of the first connection line 125 of the touch pad portion TPD and overlap the PET film 150, a portion of the FPC 180 may not contact the ACF 184 or may not be electrically connected to the first connection line 125 through the ACF 184. Accordingly, the FPC 180 may be formed to be spaced apart from the PET film 150, and the resin pattern 190 may be formed on the first connection line 125 for protection.

Since an additional operation of coating a resin may be required for the resin pattern 190, fabrication process for the touch display device may be complicated and fabrication cost may increase. In addition, the first connection line 125 may be corroded during the step of forming the resin pattern 190.

The PET film 150 may cause an increase of thickness and fabrication cost of the touch display device and reduction of transmittance of the touch display device. As the first and second touch electrodes 124 and 126 may be formed on the single base film 122 in the touch display device according to an embodiment, thickness and fabrication cost may be reduced and transmittance may increase as compared with the touch display device according to the related art in which the first and second touch electrodes are formed on two substrates. However, as the PET film 150 may be further formed for protecting the first touch electrode 124 of the touch panel 120, improvement in thickness, fabrication cost, and transmittance may be reduced.

The touch display device in which thickness and fabrication cost may be further reduced and transmittance may be increased will be illustrated hereinafter.

Figure 5:
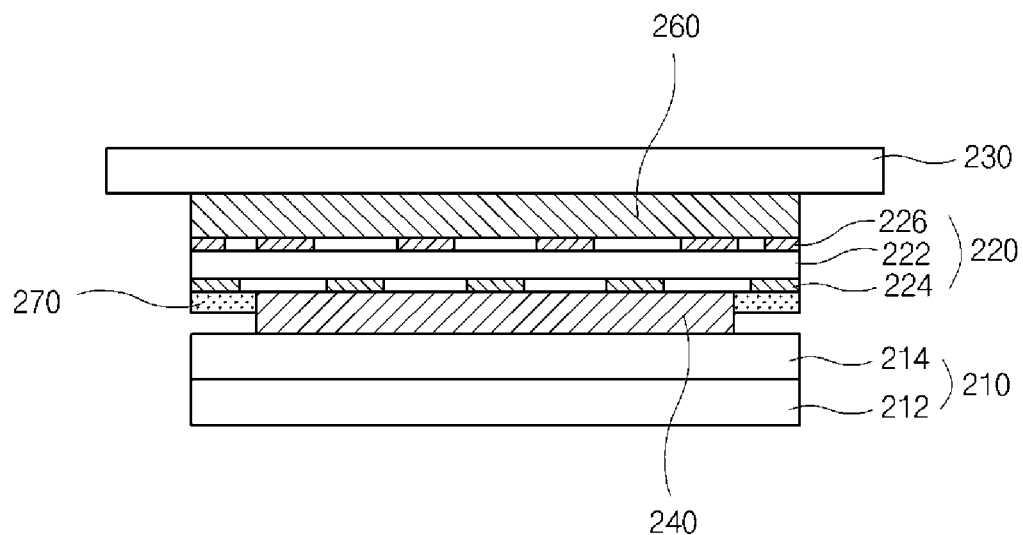
FIG. 5 is a cross-sectional view showing a touch display device according to an embodiment.

FIG. 5 is a cross-sectional view showing a touch display device according to an embodiment.

In FIG. 5, a touch display device according to an embodiment may include a display panel 210, a touch panel 220 on the display panel 210, a cover glass 230 on the touch panel 220, an adhesive material layer 240 for attaching the display panel 210 and the touch panel 220, an insulating pattern 270 covering an edge portion of a bottom surface of the touch panel 220, and an adhesive film 260 for attaching the touch panel 220 and the cover glass 230.

For example, the display panel 210 may include a liquid crystal display (LCD) device or an organic light emitting diode (OLED) display device. The LCD device used as the display panel 210 may include a first substrate 212 having a thin film transistor (TFT) and a pixel electrode thereon, a second substrate 214 having a color filter layer and a common electrode thereon, and a liquid crystal layer between the first and second substrates.

The touch panel 220 may include a base film 222, first and second touch electrodes 224 and 226 on opposite surfaces of the base film 222, and an insulating pattern 270 at an edge portion of the base film 222. For example, the first touch electrode 224 may be formed on a bottom surface of the base film 222 and the second touch electrode 226 may be formed on a top surface of the base film 222. The base film 222 may function as a dielectric layer between the first and second touch electrodes 224 and 226, such that the base film 222 and the first and second touch electrodes 224 and 226 may constitute the touch panel 220. Each of the first and second touch electrodes 224 and 226 may include a transparent conductive material, such as indium-tin oxide (ITO) and indium-zinc-oxide (IZO).

The insulating pattern 270 may be formed at the edge portion of the bottom surface of the base film 222 to cover a portion of the first touch electrode 224 and the first connection line exposed outside the adhesive material layer 240. In addition, the insulating pattern 270 may have a thickness smaller than the adhesive material layer 240 that may avoid an increase in thickness of the touch display device. For example, the insulating pattern 270 may have a thickness within a range of about 5 μm to about 10 μm.

The insulating pattern 270 may include an acrylic resin. For example, the insulating pattern 270 may be formed through a photolithographic process including coating a photo acrylic resin material, irradiating light onto the coated photo acrylic resin material, and developing the irradiated photo acrylic resin material. In the irradiating operation, the photomask may be aligned to a sidewall for forming the adhesive material layer 240.

In a touch panel according to the related art, as first and second touch electrodes 25, 27 are formed on upper and lower substrates 21, 23, respectively, facing and spaced apart from each other, thickness and fabrication cost of the touch display device increase as compared with a display device according to an embodiment.

In the touch panel 220, as the first and second touch electrodes 224 and 226 are formed on the bottom and top surfaces, respectively, of the single base film 222, increase in thickness and fabrication cost of the touch display device may be minimized.

The touch panel 220 may be attached to the display panel 210 with the adhesive material layer 240, and the cover glass 230 may be attached to the touch panel 220 with the adhesive film 260 covering entire top surface of the touch panel 220. For example, each of the adhesive material layer 240 and the adhesive film 260 may include one of an optically clear resin (OCR) and an optically clear adhesive (OCA).

The adhesive material layer 240 may be formed by coating and curing an adhesive material. For example, after a sidewall is formed in an edge portion on a top surface of the display panel 210, an adhesive material of a liquid phase may be formed in the sidewall on the display panel 210 and then may be cured to form the adhesive material layer 240 on the display panel 210. As a result, a boundary portion of the display panel 210 and the touch panel 220 may be exposed outside the adhesive material layer 240. As the first touch electrode 224 in a non-display region on the bottom surface of the base film 222 may be exposed outside the adhesive material layer 240, the first touch electrode 224 in the non-display region may be deteriorated physically or chemically.

Although not shown, a first connection line of a metallic material such as copper (Cu) and aluminum (Al) may be formed in the non-display region of the base film 222 for connecting the first touch electrode 224 of a transparent conductive material, such as ITO and IZO, to an external circuit. In the touch display device according to an embodiment, as the insulating pattern 270 may be formed at the edge portion of the bottom surface of the base film 222 to cover the first touch electrode 224 and the first connection line exposed outside the adhesive material layer 240, deterioration, such as corrosion of the first touch electrode 224 and the first connection line, may be prevented.

Although the first touch electrode 224 and the first connection line in a non-display region may be exposed outside the adhesive material layer 240 having an area smaller than the touch panel 220, the insulating pattern 270 may be formed outside the adhesive material layer 240 on the bottom surface of the base film 222 of the touch panel 220 to cover the first touch electrode 224 and the first connection line. As a result, deterioration of the first touch electrode 224 and the first connection line may be prevented without the PET film 150 (FIG. 2).

In addition, as the insulating pattern 270 may be formed exclusively at the edge portion of the touch panel 220 and may not be formed at a central portion of the touch panel 220, a thickness of the touch display panel may be reduced as compared with the touch display panel according to FIG. 2 embodiment in which the PET film 150 covers an entire bottom surface of the touch panel 120. Further, as the insulating pattern 270 may be formed exclusively in the non-display region that may not be used for displaying an image, reduction in transmittance may not be caused by the insulating pattern 270.

Figure 6:
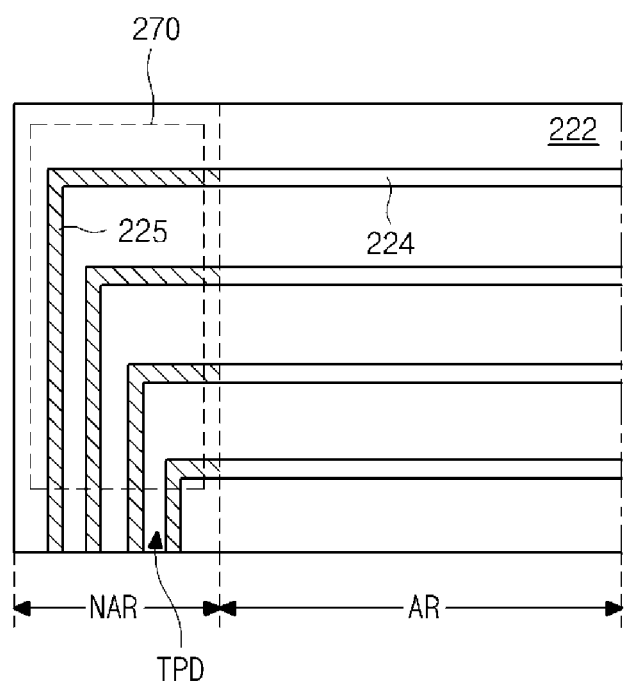
FIG. 6 is a plan view showing a bottom surface of a touch panel of a touch display device according to an embodiment.
Figure 7:
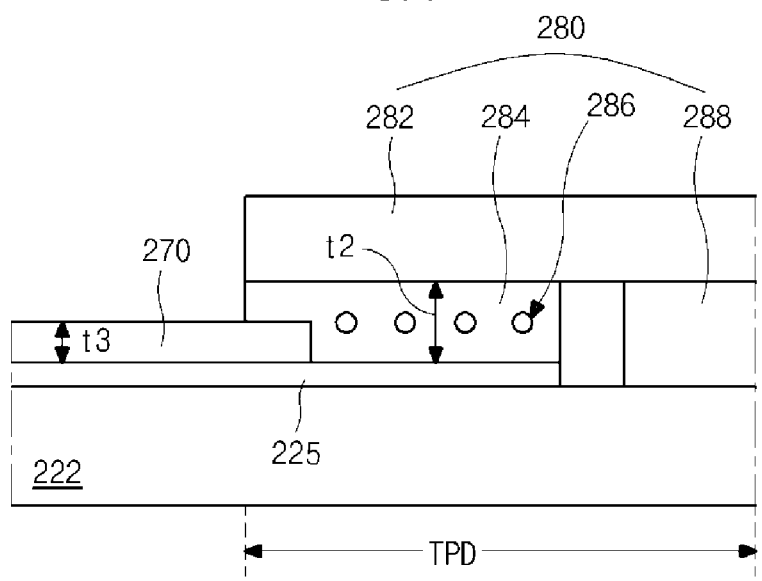
FIG. 7 is a cross-sectional view showing a bonding structure of a touch panel of a touch display device according to an embodiment.

FIG. 6 is a plan view showing a bottom surface of a touch panel of a touch display device according to an embodiment. FIG. 7 is a cross-sectional view showing a bonding structure of a touch panel of a touch display device according to an embodiment.

In FIG. 6, the first touch electrode 224 may be formed along a first direction in the display region AR on the bottom surface of the base film 222 (FIG. 5) of the touch panel 220 (FIG. 5), and the second touch electrode 226 (FIG. 5) may be formed along a second direction crossing the first direction in the display region AR on the top surface of the base film 222. As the light from the display panel 210 (FIG. 5) for displaying an image may pass through the display region AR, the first and second touch electrodes 224 and 226 may include a transparent conductive material such as ITO and IZO for increasing transmittance.

In addition, the first connection line 225 connected to the first touch electrode 224 may be formed in the non-display region NAR on the bottom surface of the base film 222, and the second connection line (not shown) connected to the second touch electrode 226 (FIG. 5) may be formed in the non-display region NAR on the top surface of the base film 222. The first connection line 225 may connect the first touch electrode 224 to the external circuit (not shown) and the second connection line may connect the second touch electrode 226 to the external circuit. As the first connection line 225 and the second connection line may transmit signals for touch sensing between the external circuit and the touch panel 220, the first connection line 225 and the second connection line may include a metallic material such as Cu and Al for reducing resistance and delay.

For example, the first and second touch electrodes 224, 226 may have a single-layered structure of a transparent conductive material layer, and the first connection line 225 and the second connection line may have a double-layered structure of a transparent conductive material layer and a metallic material layer on the transparent conductive material layer. The transparent conductive material layer under the metallic material layer of the first connection line 225 and the second connection line may have the same material and the same layer as the transparent conductive material layer of the first and second touch electrodes 224, 226.

In addition, the insulating pattern 270 may be formed in the non-display region NAR of the base film 222 to cover the first connection line 225. For the purpose of attaching a flexible printed circuit (FPC) for electrical connection with the external circuit, for example, a portion of the first connection line 225 may not be covered with the insulating pattern 270, such that the first connection line 225 may be partially exposed outside the insulating pattern 270 in a touch pad portion TPD. Although not shown, the second connection line may be partially exposed, for example, for electrical connection with the external circuit.

In the touch display device including the display panel 210 and the touch panel 220 attached to each other, as the first touch electrode 224 in the display region AR may be covered with the adhesive material layer 240 (FIG. 5), deterioration of the first touch electrode 224 may be prevented. In addition, since the first connection line 225 in the non-display region NAR may be covered with the insulating pattern 270, deterioration, such as corrosion of the first connection line 225, may be prevented. Further, the bottom surface of the base film 222 may be completely covered with the adhesive material layer 240 and the insulating pattern 270 by aligning the insulating pattern 270 to the sidewall for the adhesive material layer 240.

In FIG. 7, the first connection line 225 of the touch pad portion TPD may be exposed outside the insulating pattern 270, and an FPC 280 may be connected to the first connection line 225 of the touch pad portion TPD.

The FPC 280 may include a base 282, an anisotropic conductive film (ACF) 284 in an end portion on the base 282, and an insulating layer 288 in a central portion on the base 282. The ACF 284 may include a conductive ball 286, for example, for electrical connection. Although not shown, a plurality of signal lines may be formed on the base 282, and the insulating layer 288 may protect the plurality of signal lines.

After the FPC 280 contacts the ACF 284 on the first connection line 225, the FPC 280 may be pressurized toward the first connection line 225, such that the plurality of signal lines on the base 282 may be electrically connected to the first connection line 225 through the conductive ball 286. The insulating pattern 270 may have a thickness equal to or smaller than the ACF 284. For example, the ACF 284 may have a second thickness t2 within a range of about 5 μm to about 20 μm, and the insulating pattern 270 may have a third thickness t3 within a range of about 5 μm to about 10 μm equal to or smaller than the second thickness t2.

When the third thickness t3 of the insulating pattern 270 is smaller than the second thickness t2 of the ACF 284, the ACF 284 may be formed to cover a top surface of the insulating pattern 270. In addition, when the third thickness t3 of the insulating pattern 270 is equal to the second thickness t2 of the ACF 284, the base 282 of the FPC 280 may be formed to cover the top surface of the insulating pattern 270. In the touch display device according to an embodiment, deterioration, such as corrosion of the first touch electrode 224 and the first connection line 225, may be prevented, and the FPC 280 may be connected to the first connection line 225 without the resin pattern 190 (FIG. 4) due to the insulating pattern 270.

Consequently, in a touch display device according to an embodiment, as first and second touch electrodes are formed on opposite surfaces of a single base film, the total number of substrates may be reduced. As a result, thickness and fabrication cost of the touch display device may be reduced and transmittance may increase.

In addition, as an insulating pattern may be formed at an edge portion in a non-display region on a bottom surface of a base film of a touch panel, a touch connection line and a touch electrode in the non-display region may be protected and thickness, fabrication cost, and transmittance may be further improved. Further, as an FPC may completely cover a touch connection line and a touch electrode outside an insulating pattern, deterioration, such as corrosion of the touch connection line and the touch electrode, may be prevented.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch display device, comprising:
   a display panel, comprising:
      a display region; and
      a non-display region;
   an adhesive material layer on the display panel;
   a touch panel on the adhesive material layer, the touch panel comprising:
      a base film;
      a first touch electrode on a bottom surface of the base film facing the display panel, the first touch electrode comprising an exposed portion in the non-display region;
      a second touch electrode on a top surface of the base film; and
      an insulating pattern at an edge portion of the bottom surface of the base film; and
   a cover glass on the touch panel,
   wherein the adhesive material layer is disposed at a central portion of the bottom surface of the base film not covering the exposed portion of the first touch electrode,
   wherein the insulating pattern is disposed around the adhesive material layer to cover the exposed portion of the first touch electrode,
   wherein a flexible printed circuit board overlaps the insulating pattern and the exposed portion,
   wherein the insulating pattern is disposed between the exposed portion and the flexible printed circuit board, and
   wherein an anisotropic conductive film fills a space between the base film and the flexible printed circuit board.

2. The touch display device of claim 1, wherein a thickness of the insulating pattern is smaller than a thickness of the adhesive material layer.

3. The touch display device of claim 1, wherein:
   a first connection line connected to the first touch electrode is formed at the edge portion of the bottom surface of the base film; and
   the insulating pattern covers the first touch electrode and the first connection line.

4. The touch display device of claim 3, wherein the flexible printed circuit board is connected to the exposed portion of the first connection line.

5. The touch display device of claim 4, wherein:
   the first touch electrode comprises a single-layered structure of a transparent conductive material layer; and
   the first connection line comprises:
      a double-layered structure of a transparent conductive material layer; and
      a metallic material layer on the transparent conductive material layer.

6. The touch display device of claim 5, wherein the transparent conductive material layer of the first touch electrode comprises a same layer and a same material as the transparent conductive material layer of the first connection line.

7. The touch display device of claim 1, wherein:
   the insulating pattern comprises a first thickness; and
   the anisotropic conductive film comprises a second thickness equal to or greater than the first thickness.

8. The touch display device of claim 7, wherein:
the first thickness is within a range of about 5 µm to about 10 µm; and
the second thickness is within a range of about 5 µm to about 20 µm.

9. The touch display device of claim 1, wherein the insulating pattern comprises an acrylic resin.

10. The touch display device of claim 1, further comprising an adhesive film configured to attach the touch panel and the cover glass.

11. The touch display device of claim 1, wherein:
the first touch electrode, at a central portion of the bottom surface of the base film, is in direct contact with the adhesive material layer; and
the insulating pattern disposed around the central portion.

12. A method of forming a touch display device, the method comprising:
providing a display panel, the display panel comprising:
a display region; and
a non-display region;
forming an adhesive material layer on the display panel;
forming a touch panel on the adhesive material layer, the forming a touch panel comprising:
forming a base film;
forming a first touch electrode on a bottom surface of the base film facing the display panel, the first touch electrode comprising an exposed portion in the non-display region;
forming a second touch electrode on a top surface of the base film; and
forming an insulating pattern at an edge portion of the bottom surface of the base film; and
providing a cover glass on the touch panel,
wherein the adhesive material layer is disposed at a central portion of the bottom surface of the base film not covering the exposed portion of the first touch electrode, and
wherein the insulating pattern is disposed around the adhesive material layer to cover the exposed portion of the first touch electrode,
wherein a flexible printed circuit board overlaps the insulating pattern and the exposed portion,
wherein the insulating pattern is disposed between the base film and the flexible printed circuit board, and
wherein an anisotropic conductive film fills a space between the exposed portion and the flexible printed circuit board.

13. The method of claim 12, wherein a thickness of the insulating pattern is smaller than a thickness of the adhesive material layer.

14. The method of claim 12, wherein:
a first connection line connected to the first touch electrode is formed at the edge portion of the bottom surface of the base film; and
the insulating pattern covers the first touch electrode and the first connection line.

15. The method of claim 14, wherein the flexible printed circuit board is connected to the exposed portion of the first connection line.

16. The method of claim 15, wherein:
the forming the first touch electrode comprises forming a single-layered structure of a transparent conductive material layer; and
the forming the first connection line comprises:
forming a double-layered structure of a transparent conductive material layer; and
forming a metallic material layer on the transparent conductive material layer.

17. The method of claim 16, wherein the transparent conductive material layer of the first touch electrode comprises a same layer and a same material as the transparent conductive material layer of the first connection line.

18. The method of claim 12, wherein:
the insulating pattern comprises a first thickness; and
the anisotropic conductive film comprises a second thickness equal to or greater than the first thickness.

* * * * *